350-96.15 SR
XR 3,777,149

United States Patent
Marcatili

[11] 3,777,149
[45] Dec. 4, 1973

[54] SIGNAL DETECTION AND DELAY EQUALIZATION IN OPTICAL FIBER TRANSMISSION SYSTEMS

[75] Inventor: Enrique Alfredo Jose Marcatili, Rumson, N.J.

[73] Assignee: Bell Telephone Laboratories, Incorporated, Murray Hill, N.J.

[22] Filed: July 17, 1972

[21] Appl. No.: 272,371

[52] U.S. Cl. .................... 250/209, 250/227, 333/95, 350/96 WG
[51] Int. Cl. .......................... G02b 5/14, H01p 3/12
[58] Field of Search ............... 350/96 WG; 250/227, 250/209, 208; 333/95

[56] References Cited
UNITED STATES PATENTS
3,584,230 6/1971 Tien ............................ 350/96 WG

*Primary Examiner*—James W. Lawrence
*Assistant Examiner*—T. N. Grigsby
*Attorney*—W. L. Keefauver

[57] ABSTRACT

A stripper at the end of an optical fiber selectively couples propagating signal components out of the fiber at characteristic angles. A linear array of photodetectors selectively responds to each of the coupled signal components or to groups of such components. When used simply as a mode or as a frequency separator, the detected signals are separately coupled to different output circuits. In a detector-equalizer embodiment, the signals, suitably delayed relative to each other, are coupled to a common output circuit.

11 Claims, 8 Drawing Figures

3777149
OR IN 250/209

SIGNAL DETECTION AND DELAY EQUALIZATION IN OPTICAL FIBER TRANSMISSION SYSTEMS

This invention relates to mode separators and detector-equalizers for use with single mode and multimode optical fibers.

BACKGROUND OF THE INVENTION

Recent advances in the fabrication of ultratransparent materials have demonstrated that fibers are a promising transmission medium for optical communication systems. By using coherent sources and single mode fibers, such systems are theoretically capable of operating at pulse rates of the order of a few gigahertz.

There are, however, many applications which are preferably optimized with respect to cost and simplicity, rather than speed. Systems of this latter kind would employ incoherent light sources and multimode fibers.

Finally, there are also applications wherein multimode fibers are advantageously used with single mode sources, such as lasers.

In the copending application by E. A. J. Marcatili, Ser. No. 247,448 filed Apr. 28, 1972, there is described an arrangement for coupling an incoherent signal source to a multimode fiber. As noted therein, one of the problems associated with such systems is the delay distortion resulting from the fact that the various modes propagate with different group velocities. While means are disclosed for minimizing this distortion, it cannot be totally eliminated.

Delay distortion effects also occur in single mode fibers due to differences in the propagation velocities of different frequency signals.

It is, accordingly, one of the objects of the present invention to minimize the delay distortion produced in single mode and in multimode optical fibers. If there is no significant mode coupling along the fiber, the various modes can also be used as the carriers in a spacially multiplexed communication system. In this latter case, means must be provided at the output end of the fiber for separating the various modes.

It is, accordingly, a second object of the invention to separate the various modes propagating along a multimode optical fiber.

SUMMARY OF THE INVENTION

As is known, wave energy propagating along an optical fiber at a particular frequency and in a particular modal configuration is uniquely characterized by a ray progressing along the fiber at a specific angle to the fiber axis. In a single mode fiber, the lower frequency signals propagate at larger angles and, hence, at lower velocities. The higher frequency signals, on the other hand, propagate at smaller angles and correspondingly higher velocities.

In a multimode fiber, a similar situation exists wherein the higher order modes propagate at larger angles to the guide axis, and at slower velocities, while the lower order modes propagate at smaller angles and at higher velocities. While there is also a dispersive effect due to frequency in a multimode guide, the modal effect is much greater and, hence, to a first approximation, the former can be neglected in a multimode waveguide. Thus, in both the single mode and in the multimode waveguide, wave energy propagates at different guided wavelengths due to the different angles at which the representative ray, characteristic of the particular component of wave energy, is directed.

Typically, an optical waveguide comprises a filamentary core surrounded by a cladding of lower refractive index. Normally, the guided wave energy is totally reflected at the core-cladding interface. In accordance with the present invention, this guidance mechanism is interrupted by means of a "stripper" which couples the wave energy out of the fiber while preserving the relative ray orientations characteristic of the propagating wave energy. Specifically, the stripper comprises a slab-like element of dielectric material whose refractive index is equal to or greater than that of the fiber core. The stripper is disposed along a portion of the fiber in coupling relationship with the fiber core. An array of photodetectors is disposed adjacent to one side of the stripper such that each detector intercepts wave energy propagating at different characteristic angles. In a multimode fiber, the detectors intercept a different one of the propagating modes, or a different group of such modes. In a single mode fiber, each detector responds to a different frequency, or group of frequencies.

In a detector-equalizer, in accordance with a first embodiment of the invention, the output signals, suitably delayed relative to each other so as to compensate for the delay distortion introduced by the fiber, are combined in a common output circuit. Alternatively, when used simply as a mode separator, or frequency separator, the detector output signals are separately coupled to different output circuits.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
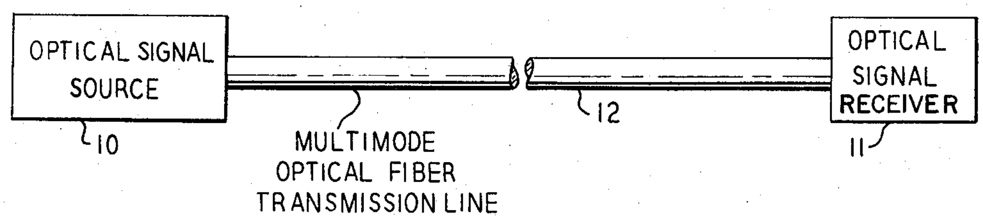
FIG. 1 shows, in block diagram, a multimode optical communication system.

Referring to the drawings, FIG. 1 shows, in block diagram, an optical communication system comprising an optical signal source 10, a signal receiver 11, and a multimode optical fiber transmission line 12 coupling the source to the receiver.

The present invention relates particularly to the output of the system and, specifically, to the detector in the receiver. In this regard, reference is first made to FIG. 2 which shows a portion of line 12 comprising an inner core 14 surrounded by a cladding 15 of lower refractive index.

Figure 2:
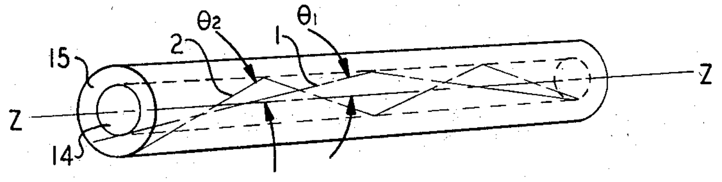
FIG. 2 shows a portion of an optical fiber and two rays characterizing two propagating modes.

As noted above, in a multimode system, each of the various propagating modes is characterized by a ray progressing along the fiber at a specific angle to the fiber axis. For purposes of explanation, two rays 1 and 2 are illustrated in FIG. 2, where the lower order mode ray 1 is shown propagating at an angle $\theta_1$ to the fiber axis Z—Z, and a higher order mode ray 2 is shown directed at a larger angle $\theta_2$ to the axis. Both rays are reflected at the core-cladding interface and, hence, are guided along the fiber. Those high order modes whose angles of incidence at the interface are less than critical are not reflected, and tend to radiate out of the fiber. The maximum ray angle $\theta_{max}$ for a guided mode is given by $$\theta_{max} = \sqrt{2\Delta} \quad (1)$$

where $n$ is the refractive index of the fiber core;

$n(1-\Delta)$ is the refractive index of the fiber cladding; and $\Delta$ is a positive number, typically less than 0.1.

The relative delay, $\tau$, between any of the higher order modes and the fastest mode is given by $$\tau = nL/2c\ \theta^2 \quad (2)$$

where

L is the line length;

$c$ is the vacuum velocity of light; and $\theta$ is the ray angle for the particular mode.

From the above, it is apparent that the various modes propagating along a multimode fiber will arrive at the output end of transmission line 12 at different times, thus requiring some sort of compensation at the receiver. In a detector-equalizer, in accordance with one aspect of the present invention, a mode stripper couples the several modes out of the fiber at their characteristic propagating angles and onto an array of photodetectors which are dimensioned and arranged to respond selectively to the individual modes, or to separate groups of said modes. The resulting detector signals are then coupled to a common output circuit by means of delay networks which delay the several signals relative to each other so as to compensate for the delay distortion introduced by the transmission line.

Figure 3:
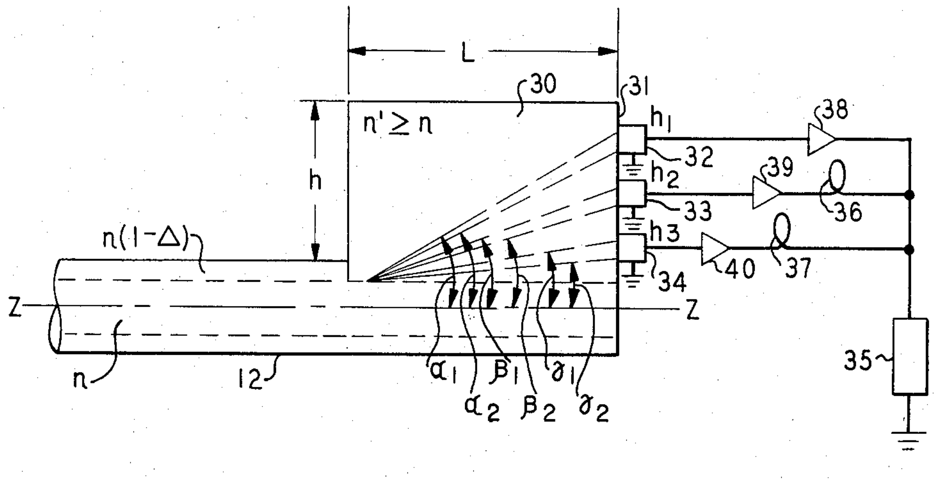
FIG. 3 shows a first embodiment of a detector-equalizer in accordance with the present invention.

FIG. 3, now to be considered, shows one specific embodiment of the invention including a mode stripper 30, comprising a slab of transparent material whose refractive index is equal to, or greater than, that of the fiber core, disposed along a portion of transmission line 12 and in coupling relationship with the fiber core. In the normal fiber, the propagating wave energy is totally reflected at the core-cladding interface. In accordance with the present invention, this guidance mechanism is interrupted by removing all or most of the cladding over the coupling interval and placing stripper 30 in contact with, or within two to three wavelengths of the core.

In the preferred case in which the refractive index of the stripper is equal to the refractive index of the core, the length L of the stripper in the direction along the fiber can be as short as ten wavelengths. If, on the other hand, the refractive indices differ by a few percent, a longer stripper, of the order of at least a hundred wavelengths, is used. Since the stripper is in coupling relationship with the fiber core, the fiber cladding along this region must be removed, as will be described in greater detail hereinbelow.

A linear array of photodetectors is located along the far end 31 of mode stripper 30. For purposes of illustration, three detectors 32, 33 and 34 are shown. Each of the detectors is coupled to a common output circuit 35 by means which include, as required, delay networks and, optionally, amplifying means. Specifically, delay networks 36 and 37 are included between diodes 33 and 34, respectively, and output circuit 35. No added delay need be included between diode 32, which serves to detect the highest order modes (i.e., the slowest propagating modes).

In operation, the various modes propagate along fiber 12 in the manner described above. However, upon entering the region of the mode stripper, the core-cladding interface no longer exists so that the modes are no longer totally reflected but, instead, are coupled out of the fiber core and into the body of the stripper. When the refractive indices of the mode stripper and core are equal, total coupling occurs over an interval of only a few wavelengths. More specifically, modes propagating within the range of angles between $\alpha_1$ and $\alpha_2$ are intercepted by diode 32; those within the range between $\beta_1$ and $\beta_2$ are intercepted by diode 33; while those within the range $\delta_1$ and $\delta_2$ impinge upon diode 34.

Designating the total average delay at the output end of fiber 12 for each of the three groups of modes to be separately detected as $D_1<D_2<D_3$, where $D_1$ is the delay of the lowest order modes, $D_3$ is the delay of the highest order modes, and $D_2$ is the delay of the intermediate order modes, the average added delays $\tau_1$ and $\tau_2$ introduced by the two delay networks 37 and 36 are given by $$\tau_1 = D_3 - D_1 \quad (3)$$

$$\tau_2 = D_3 - D_2\ . \quad (4)$$

Figure 4:
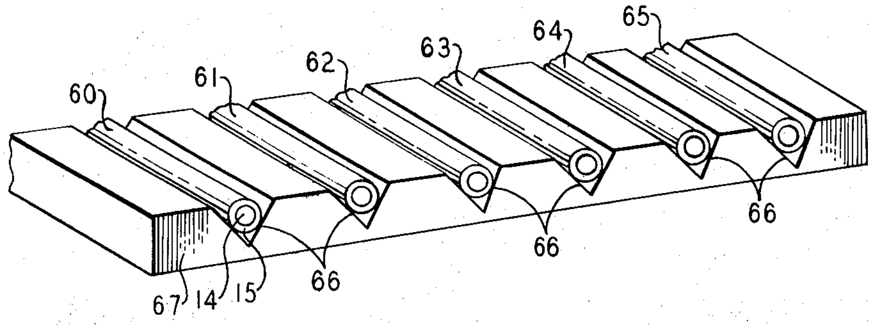
FIG. 4–7 show the various steps in the fabrication of a mode stripper in accordance with the invention.
Figure 5:
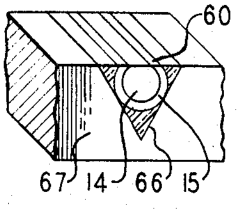
Figure 6:
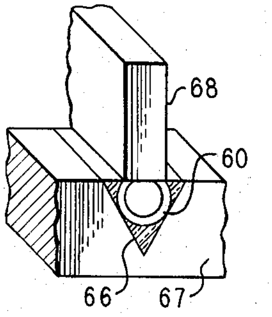
Figure 7:
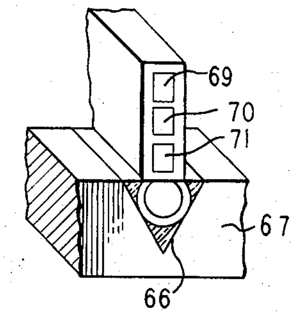

FIGS. 4 to 7, now to be considered, illustrate the various steps in one of the many possible ways of fabricating a mode detector in accordance with the teachings of the present invention. The first of the figures, FIG. 4, shows the terminal ends of a plurality of optical fibers 60, 61, 62, 63, 64 and 65 individually placed in an equal plurality of grooves 66 cut in a supporting frame 67. The grooves are dimensioned such that the fibers extend above the top of the frame an amount slightly greater than the thickness of the fiber cladding 15. The fibers are securely bonded to the frame and are then ground flush with the upper surface of the frame, exposing the core 14. FIG. 5 shows one of the fibers 60 after the grinding operation. FIG. 6 shows fiber 60 with the mode stripper 68 bonded in place in contact with the fiber core. Finally, FIG. 7 shows the photodetectors 69, 70 and 71 affixed to the output end of the stripper.

As was indicated above, when the refractive indices of the mode stripper and the fiber core are the same, the optical wave is coupled out of the fiber and into the core over a distance equal to a very few wavelengths. If, however, there is a slight mismatch of as little as a few tenths of a percent, or if the cladding is not totally removed, this coupling interval is extended. As a result, there is a spacial dispersion of the wave energy associated with each mode and a certain amount of cross coupling among the several modes, or among the several groups of modes. This is avoided in a second embodiment of the invention, illustrated in FIG. 8, wherein the mode stripper 80 located along fiber 81 is provided with a focusing element at its output end. In the illustrative embodiment, the focusing element is merely a curved surface 82 which focuses rays incident thereon at a different angle at a different point in space. Thus, parallel rays associated with one mode, shown in solid line, are focused at a first point 5 in space. Similarly, parallel rays associated with a second mode, shown in broken line, and incident along surface 82 at a different angle, are focused at a different point 6 in space. Accordingly, in this embodiment, the photodetectors are not bonded to the mode stripper as in FIG. 3 but, instead are located at points 5 and 6 within the focal plane of the focusing element. Thus, a first detector 83 is located at point 5 for the mode represented by the solid lines, and a second detection 84 is located at point 6 for the mode represented by the broken lines. Similarly, additional detectors, such as 85, are located at the points for the other modes, or groups of modes that are to be detected separately.

Focusing action is only required in one direction if the curvature of surface 82 is such as to focus the wave energy within a distance over which the light remains collimated. Specifically, when $$f < t^2/\lambda \qquad (5)$$

where $f$ is the focal length of the lens;

$t$ is the slab thickness;

and $\lambda$ is the signal wavelength.

Figure 8:
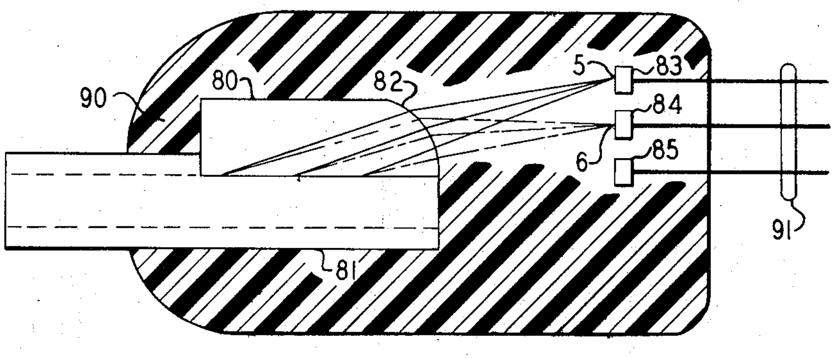
FIG. 8 shows a second embodiment of a mode detector.

In either of the above-described arrangements, the optimum location and orientation of the detectors is conveniently realized by illuminating a length of fiber by means of a pulsed incoherent source, and then varying the position of the detectors about their approximated positions until the narrowest output pulse is obtained. In the embodiment of FIG. 3, the detectors are then bonded directly to the mode stripper. In the embodiment of FIG. 8, the mode stripper, fiber, and detectors are bonded together by means of a suitable potting material whose refractive index is less than that of the stripper material. For example, typical glasses used in the fabrication of optical fibers have refractive indices of about 1.5. Accordingly, a material such as tetrafluoroethylene-propylene copolymer (sold under the trade name "Teflon FEP"), having a refractive index of 1.33, can be used as the potting material.

The above-described fabrication and alignment procedures can be performed in the field, in which case the stripper and detectors are connected directly to the end of a service fiber. Alternatively, the aligning and bonding procedure can be performed at the factory, in which case the stripper and detectors are connected to a small segment of fiber. The latter arrangement is illustrated in FIG. 8 which shows stripper 80 and detectors 83, 84 and 85 disposed at the end of a short segment of fiber 81 and bonded together by means of a potting material 90. Leads 91 permit connecting the output load or loads to the detectors. In the field, the fiber segment 90 is then spliced to the terminal end of a service fiber. This can be done, for example, in the manner described in the copending application of R.F. Trambarulo, Ser. No. 239,034, filed Mar. 20, 1972, or of F. A. Braun et al., Ser. No. 227,908, filed Feb. 22, 1972, both of which are assigned to applicant's assignee.

EXAMPLE

For purposes of this example, we assume a mode stripper of the type shown in FIG. 3 located at the end of a one kilometer long fiber having a $\Delta$ of 0.01, where $n$ is the refractive index of the fiber core, and $n(1-\Delta)$ is the refractive index of the cladding.

The delay T for the fastest mode is $$T = nL/c = 5{,}000 \text{ nanoseconds.} \qquad (6)$$

The added delay $\tau_{max}$ for the slowest mode is $\tau_{max} = \Delta T = 50$ nanoseconds.

The maximum propagating angle $\theta_{max}$, for the slowest mode is $$\theta_{max} = \sqrt{2\Delta} = 0.141 \text{ radians or } 8.1°.$$

Assuming a maximum stripper height $h$ of 5 mils, the stripper length L is, therefore, $$L = 0.005/0.14 = 0.035 \text{ inch.}$$

We further assume, for purposes of illustration, three detectors, where each of the detectors 31, 32 and 33 collects radiation over a delay interval $0 - \tau_{max}/3$, $(\tau_{max}/3) - (2\tau_{max}/3)$, and two-thirds $\tau_{max} - \tau_{max}$, respectively. Using the relationship $$\tau = \tau_{max}\,(\theta/\theta_{max})^2, \qquad (7)$$

the resulting delay interval, radiation angle range, and detector heights $h_1$, $h_2$ and $h_3$ are given in the following tabulation:

TABLE I

| Delay interval nanoseconds | Radiation angle range degrees | Detector height mils |
|---|---|---|
| $0 - (\tau_{max}/3)$=0–16.6 | 0–4.7 | 0–2.88 |
| $(\tau_{max}/3)$–⅔$\tau_{max}$=16.6–33 | 4.7–6.6 | 2.88–4.05 |
| ⅔$\tau_{max}$–$\tau_{max}$=33–50 | 6.6–8.1 | 4.05–5 |

Some small space will, of course, be left between adjacent detectors.

The average delay for each of the three detector sectors is 8.3, 25 and 41.6 nanoseconds. Hence, the added delays $D_1$ and $D_2$ are $D_1$ = 41.6–25 = 16.6 nanoseconds and $D_2$ = 41.6–8.3 = 33.3 nanoseconds.

Using air filled coaxial cable as delay lines, the delay $D_1$ is obtained in 16 feet of cable, and delay $D_2$ is obtained in 33 feet of cable. For coaxial cable with a dielectric for which $\epsilon = (1.5)^2$, the indicated delays are obtained in 11 feet and 25 feet of cable, respectively. Alternatively, lumped-element delay networks can be used.

It will be noted that by using three detectors, the minimum realizable dispersion is $(\tau_{max}/3)$ or $(50/3) = 16.6$ nanoseconds. This can be reduced by increasing the number of detectors. For example, a Schottky barrier diode of the type described by M. V. Schneider in his article entitled "Schottky Barrier Photodiodes With Antireflection Coating," published in the November 1966 issue of the Bell System Technical Journal, pages 1611–1638, is capable of detecting pulses as short as 0.5 nanoseconds. Thus, the use of additional detectors, each of which covers smaller delay increments, will result in greater time resolution in the output signal. Hence, the number of diodes to be used in each instance will depend upon the type of diode used and the requirements of the particular application.

It may also be advantageous to employ some amplification before combining the several detector signals in order to improve the signal-to-noise ratio in those cases where the delay lines are lossy. Accordingly, amplifiers 39 and 40 are shown included between detectors 33 and 34 and delay networks 36 and 37. Amplifier 38, included between detector 31 and the output circuit 35, maintains the necessary amplitude balance among the output signal components.

To exclude ambient light, the stripper and detectors are advantageously placed in a lightproof enclosure when in operation. Because of their small size, and the large numbers in which such devices will be used, a common enclosure to house the terminal end of an optical fiber cable would appear to be preferable over a separate light-proof enclosure for each of the individual detectors.

As indicated above, a mode stripper can, alternatively, be used for mode separation purposes in cases in which intermodal coupling is not significant. For example, each of a number of different modes can transmit a different signal of a plurality of spacially multiplexed signals. By coupling each of the detectors to a different output circuit, the individual signals can be separately recovered.

The above-described technique can also be used with a single mode fiber either as a frequency separator, or to reduce delay distortion effects. Just as the different modes in a multimode system propagate at different velocities, signals at different frequencies in a multifrequency system similarly propagate at different velocities. Specifically, the ray multifrequency $\theta$ is related to the wavelength $\lambda$ of the signal by $$\theta = \sqrt{2\Delta} \cdot U/V \qquad (8)$$

where $$V = 2\rho an \sqrt{2\Delta}/\lambda; \qquad (9)$$

$n$ is the refractive index of the core and varies with frequency;

$a$ is the core diameter;

and $$U \cdot \frac{J_o(U)}{J_1(U)} = - \sqrt{V^2 - U^2} \cdot \frac{K_o(\sqrt{U^2-V^2})}{K_1(\sqrt{U^2-V^2})}. \qquad (10)$$

The resulting delay, $\tau$, is given by equation (2). Accordingly, in a single mode, multifrequency system arrangements similar to those shown in FIGS. 3 and 8 can be used with separate output circuits as a means of separating different frequency signals, or they can be used with a common output circuit and suitable delay networks, as a delay equalizer.

Thus, in all cases, it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A signal detector arrangement for use with an optical fiber waveguide having an inner core and outer cladding, including:

a stripper for coupling wave energy out of said fiber, comprising a slab of dielectric material in coupling relationship with said core, where the refractive index of said material is equal to or greater than the index of said core;

and an array of photodetectors disposed adjacent to said stripper where each photodetector is dimensioned and oriented to intercept wave energy coupled out of said fiber within a different range of angles.

2. The arrangement according to claim 1 wherein said fiber is a multimode waveguide; and wherein each detector intercepts wave energy associated with one of the modes guided along said fiber, or with a selected group of said modes.

3. The arrangement according to claim 1 wherein said fiber is a single mode waveguide; and wherein each detector intercepts different frequency wave energy.

4. The arrangement according to claim 1 wherein each of said detectors is coupled to an output circuit.

5. The arrangement according to claim 1 including a common output circuit;

and means for coupling each of said detectors to said common output circuit.

6. The arrangement according to claim 5 wherein said coupling means includes delay networks for compensating for the delay distortion produced in said fiber.

7. The arrangement according to claim 1 wherein each of said photodetectors is a Schottky barrier photodiode.

8. The arrangement according to claim 2 including means for focusing the wave energy associated with a different one of said modes, or with a different selected group of said modes onto each of said photodetectors;

and wherein said photodetectors are located at the focal plane of said focusing means for said different modes.

9. A detector-equalizer for use with a multimode optical fiber waveguide comprising:

a signal detector arrangement in accordance with claim 1;

a common output circuit;

and means including delay networks for coupling the output signals from said array of photodetectors to said output circuit to minimize the delay distortion introduced by said fiber.

10. The detector-equalizer according to claim 9 wherein the means for coupling the output signals from the photodetectors responsive to the faster propagating modes include delay networks for equalizing the total average delay for all of said groups of modes.

11. The detector-equalizer according to claim 8 wherein said coupling means include signal amplifiers.

* * * * *